US005742849A

United States Patent [19]
Nakamura

[11] Patent Number: 5,742,849
[45] Date of Patent: Apr. 21, 1998

[54] HIGH-PERFORMANCE COMPUTER SYSTEM OF A PARALLEL WRITE-BUFFERING TYPE

[75] Inventor: Nobutaka Nakamura, Tokyo, Japan

[73] Assignee: Kabushiki Kaisha Toshiba, Kawasaki, Japan

[21] Appl. No.: 796,955

[22] Filed: Feb. 7, 1997

Related U.S. Application Data

[63] Continuation of Ser. No. 330,679, Oct. 28, 1994, abandoned.

[30] Foreign Application Priority Data

Oct. 28, 1993 [JP] Japan ................... 5-270963

[51] Int. Cl.⁶ .................................................. G06F 13/00
[52] U.S. Cl. .................. 395/872; 395/432; 395/494; 395/469; 395/410
[58] Field of Search ............................ 395/517, 823, 395/412, 432, 877, 878, 494, 495, 872, 469, 410, 421.01; 365/189.05, 230.08

[56] References Cited

U.S. PATENT DOCUMENTS

| | | | |
|---|---|---|---|
| 4,157,587 | 6/1979 | Joyce et al. | 395/464 |
| 4,621,320 | 11/1986 | Holste et al. | 395/421.03 |
| 4,695,943 | 9/1987 | Keeley et al. | 395/467 |
| 4,727,491 | 2/1988 | Culley | 395/500 |
| 5,034,917 | 7/1991 | Bland et al. | 395/494 |
| 5,117,493 | 5/1992 | Jensen | 395/467 |
| 5,263,142 | 11/1993 | Watkins et al. | 395/842 |
| 5,276,849 | 1/1994 | Patel | 395/468 |
| 5,285,323 | 2/1994 | Hetherington et al. | 395/449 |
| 5,289,584 | 2/1994 | Thome et al. | 395/436 |
| 5,355,348 | 10/1994 | Ooishi | 365/230.06 |
| 5,388,242 | 2/1995 | Jewett | 395/440 |
| 5,430,844 | 7/1995 | Shitara et al. | 395/846 |
| 5,452,463 | 9/1995 | Parks et al. | 395/726 |
| 5,459,842 | 10/1995 | Begun et al. | 395/250 |
| 5,526,505 | 6/1996 | Ludwig | 395/417 |
| 5,526,507 | 6/1996 | Hill | 395/441 |
| 5,561,783 | 10/1996 | Vanka et al. | 395/468 |

FOREIGN PATENT DOCUMENTS 2271204  10/1992  United Kingdom

OTHER PUBLICATIONS

Margulis, Build a Multibus II single-board computer. Electronics Design, vol. 37, No. 22, p. 79(6), Oct. 26, 1989.

Primary Examiner—Matthew M. Kim
Attorney, Agent, or Firm—Oblon, Spivak, McClelland, Maier & Neustadt, P.C.

[57] ABSTRACT

A computer system including a high speed CPU, a low speed main memory, and a system controller which has a write buffer coupled to the processor data bus in parallel to the main memory for latching CPU write data. The system controller includes a gate array LSI, and an address buffer which is coupled to the CPU through a processor address bus and to the main memory through a memory address bus. When the write buffer latches the write data from the CPU, the system controller suspends the transfer of the write data to the main memory before completion of the memory write cycle. The memory write cycle is completed by transferring the latched data in the write buffer to the main memory before the CPU begins the next read/write cycle. This above configuration enables the CPU to operate with increased performance during read/write cycles and since the write buffer is connected to the CPU and main memory in parallel the number of pins required for interfacing the write buffer to the CPU and main memory is reduced compared to a configuration using a serially connected write buffer.

18 Claims, 5 Drawing Sheets

HIGH-PERFORMANCE COMPUTER SYSTEM OF A PARALLEL WRITE-BUFFERING TYPE

This application is a Continuation of application Ser. No. 08/330,679, filed Oct. 28, 1994, now abandoned.

BACKGROUND OF THE INVENTION

1. Field of the Invention

This invention relates to a write buffering type computer system which includes a write buffering means for adjusting the operational speed difference between a central processing unit (CPU) and a large capacity main memory.

In particular, this invention relates to a high performance computer system including a parallel write buffer means which is coupled to a CPU through a processor bus in parallel to a main memory.

More particularly, this invention relates to a computer system which is suitable for a small size computer system such as a lap top size or a notebook size personal computer system.

2. Discussion of Background

From a relatively large size of a console type or a desk-top type to a relatively small size of a lap top type or a notebook type, there are now introduced many types of personal computer systems in the market.

Recently, a small size computer such as a lap top type or a notebook type computer systems are becoming much more popular for a personal use due to its portability and high operation speed.

Such personal computer systems provide a microprocessor of high operational speed as the central processing unit (hereinafter referred to as a "CPU") of the system. Recently, a CPU including a cache memory means can be applicable for using as a high operational speed CPU since the cache memory contributes in a high speed memory write operation.

For example, the Intel's micro-processor i486 (TM) is suitable for a small size computer system.

On the other hand, a dynamic random access memory (hereinafter referred to as a "DRAM") is recently popular to use for a main memory of a large capacity of a personal computer systems.

However, the operational speed of the DRAM main memory is rather slower than the operational speed of the CPU. In particular, an operational speed of the memory write cycle is much slower compared to the CPU operational speed.

Consequently, some measurements for adjusting the difference of the operational speed between the CPU and the main memory are required in such a system.

Conventionally, it was proposed to provide a buffer means or a data transceiver means upon a processor bus in series between the CPU and the main memory.

However, this is not suitable for small size personal computer systems due to many problems.

The severe problem for a small size computer system is no tolerance or very small allowance of the space for providing such an additional LSI chip of a buffering means.

In order to provide a buffer means on a processor bus in serial between a CPU and a main memory, the LSI chip of the buffer means must have a large number of coupling pins for coupling to the CPU and the main memory.

For example, when a 32-bit micro-processor is used as a CPU of the system, the buffer means must have a lot of coupling pins which exceeds more than one hundred, for coupling to the processor bus.

Since a small size personal computer systems have almost no space allowance for mounting an additional component, it is impossible to provide such a write buffer means.

Another severe problem of such a serial write buffering means is to lose its cost competitiveness due to the addition of LSI chip. Further, the serial buffering type computer systems have another defect of introducing a data transferring delay in a memory read cycle from the main memory to the CPU.

Another proposal for solving the problem of the operational speed difference between a CPU and a main memory is to provide a reserved bus for only transferring memory data in a memory write cycle.

However, this method also has the same problem as mentioned above, because the reserved data bus must be coupled to a system control means with respect to the transferring data width.

For example, when a 32-bits CPU is used as a CPU, it is necessary to provide more than 32 pins for coupling the reserved bus to the system control means.

Another proposal is to provide single chip buffer means in the system control means. This is called a tape carrier package (TAP). However, with this scheme it is necessary to provide [the coupling pins exceeding] more than three hundred coupling pins.

In addition to the problem of an increase in the coupling pins, these type of buffering means have another problem of inserting a wait cycle into a CPU bus cycle when the CPU accesses the main memory directly.

Even if the CPU includes a cache memory, when there is a cache miss during a memory read/write cycle, the CPU must access the main memory directly.

Accordingly, there is a need to reduce the insertion of such wait cycles in a memory read/write cycle in order to achieve high performance in a high speed CPU.

In particular, if the processor includes a write-through-cache memory, like in the Intel i-486 micro-processor, the performance of the computer system is highly dependent on the operational speed during a memory write cycle since memory write cycles occur much more frequently than memory read cycles and also since the CPU continues memory write cycles without checking whether there was a cache address hit or not.

Consequently, in order to achieve high performance in a computer system using a write buffering means, it is inevitable to have to improve the operational speed during the direct access between the CPU and the main memory in a memory write cycle.

SUMMARY OF THE INVENTION

Accordingly, it is an object of the present invention to provide a computer system of a parallel write buffering type which can achieve high speed operation in a memory write operation. The computer system according to the present invention does not require additional coupling pins for connecting a write buffer means to a processor bus.

It is another object of the present invention to provide a computer system of a buffering type which includes a write buffer means coupled to a processor bus in parallel to a main memory for latching write data during a memory write cycle.

It is still another object of the present invention to provide a high performance computer system that does not require a wait cycle during a memory write cycle.

It is a further object of the present invention to provide a computer system of a parallel buffering type which uses a processor bus commonly without any occurrence of data collision on the processor bus.

It is still further object of the present invention to provide a parallel buffering type of computer system which includes a single gate array LSI for system controller.

It is still another object of the present invention to provide a computer system of a parallel buffering type for achieving high speed operation during a memory write cycle by using the same data transfer bus in both a memory read cycle and a memory write cycle without any data collision during the read/write cycle.

It is still another object of the present invention to provide a high performance computer system which uses a high speed CPU including cache memory and which does not require the insertion of a wait cycle into the CPU bus cycle.

It is still further object of the present invention to provide a personal computer system of a parallel write buffering type which can continue a previously suspended CPU memory write cycle by transferring a latched data to a main memory in order to complete the memory write cycle before the next CPU bus cycle.

It is still further object of the present invention to provide a small size high performance computer system which has a parallel write buffering means without increasing the number of coupling pins.

This invention provides a parallel write buffering type computer system which includes a high speed CPU, a low speed main memory, and a system controller which has a write buffer coupled to a processor data bus in parallel with the main memory for latching CPU write data, and an address buffer which is coupled to the CPU through a processor address bus and to the main memory through a memory address bus. When the write buffer latches the write data from the CPU, the CPU suspends the write cycle to the main memory before completion of the memory write cycle. The memory write cycle is completed by transferring the latched data in the write buffer to the main memory before the CPU begins the next read/write cycle.

BRIEF DESCRIPTION OF THE DRAWINGS

FIGS. 3(a) to 3(k) is a timing diagram of memory write cycle signals in the computer system shown in FIGS. 1 and 2, wherein:

FIG. 3(a) is a timing diagram of the clock signal ("CLK") from the clock generator;

FIG. 3(b) is the timing diagram of the address data signal ("CPU ADDRESS") from the CPU shown in FIG. 2;

FIG. 3(c) is the timing diagram of the address status signal ("ADS#") from the CPU shown in FIG. 2;

FIG. 3(d) is the timing diagram of the control ready signal ("RDY#") from the DRAM control circuit shown in FIG. 2;

FIG. 3(e) is the timing diagram of the memory write data signal from the CPU shown in FIG. 2;

FIG. 3(f) is the timing diagram of the latched data signal from the write buffer circuit shown in FIG. 2;

FIG. 3(g) is the timing diagram of the memory write data signal supplied into the data bus shown in FIG. 2;

FIG. 3(h) is the timing diagram of the successive row and column address signals supplied to the DRAM through the address bus from the CPU shown in FIG. 2;

FIG. 3(i) is the timing diagram of the first memory access control signal of the row address strobe signal ("RAS#") from the DRAM control circuit shown in FIG. 2;

FIG. 3(j) is the timing diagram of the second memory access control signal of the column address strobe signal ("CAS#") from the DRAM control circuit shown in FIG. 2; and FIG. 3(k) is the timing diagram of the third memory access control signal of the write enable signal ("WE#") from the DRAM control circuit shown in FIG. 2;

DESCRIPTION OF THE PREFERRED EMBODIMENTS

Figure 1:
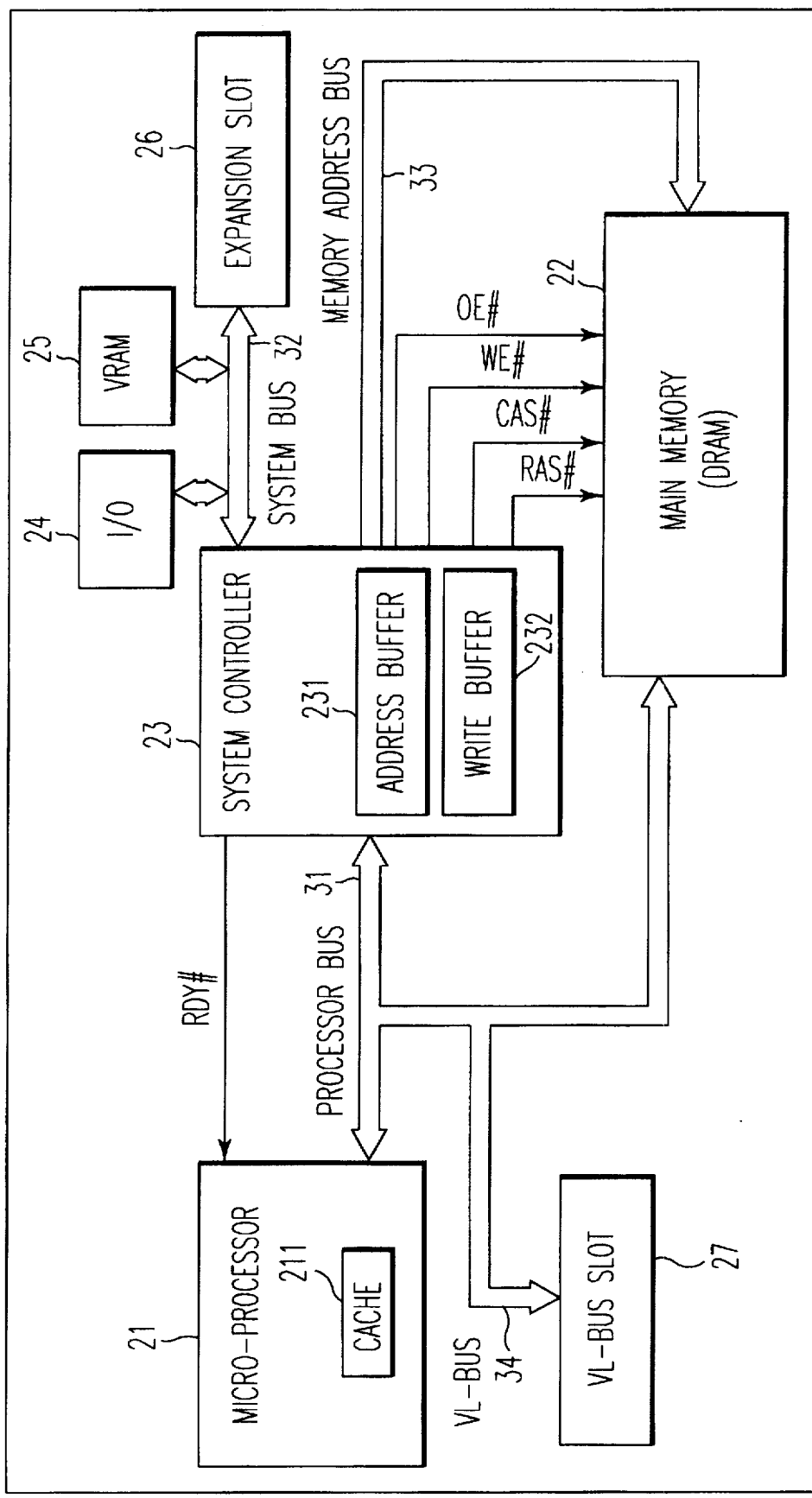
FIG. 1 shows a schematic diagram of a computer system showing one preferred embodiment of the present invention.

In FIG. 1, CPU 21 is a high speed micro-processor which may include a cache memory means 211. In this embodiment, for example, the CPU is a 32 bit micro-processor.

A main memory 22 may comprise a dynamic random access memory (DRAM) chip.

A system control means 23 includes address buffer means 231 and write buffer means 232. The system control means 23 delivers a plurality of control signals and a plurality of timing signals for controlling the operations of the components of the computer system.

Both main memory 22 and system control means (hereinafter referred to as "system controller") 23 are coupled to CPU 21 through processor bus 31 of the 32-bit type.

The address buffer means 231 in system controller 23 is coupled to DRAM main memory 22 for write cycle addresses.

The system controller 23 supplies the ready (RDY#) signal to the CPU for suspending the present memory write cycle as write buffer means 232 latches the write data from processor bus 31.

Further, system controller 23 generates an enable (OE#) signal, a write enable (WE#) signal, a column address strobe (CAS#) signal, and a row address strobe (RAS#) signal.

In the above signals "#" indicates that the signal is of negative logic.

A 16-bit system bus 32 is coupled to I/O devices 24 and a volatile random access memory 25 (hereinafter referred to as the "VRAM") and also to expansion slot 26 of the industry standard architecture ("ISA") type.

Further a vesa local bus ("VL-bus") slot 27 is also provided on mother board 20. The VL-bus slot 27 is coupled to the processor bus 32 through the VL-bus 34.

An I/O device 24, VRAM 25, and expansion slot 26 are respectively coupled to system controller 23 through an ISA system bus 32.

The Intel's i486 micro-processor is used as a CPU of a high operational speed. It includes a write-through-cache memory.

The CPU 21 transfers write data to both main memory 22 and write buffer 232 through processor bus 31 during a memory write cycle.

The processor bus 31 is comprised of a plurality of signal lines. Some of the signal lines are defined as an address bus, and some are defined as a data bus. These signal lines are directly coupled to each of input/output pins of CPU 21.

The main memory 22 stores a plurality of programs including an operating system ("OS") program, a plurality of application programs, and data for data processing in the CPU.

The main memory 22 is comprised of a plurality of dynamic random access memory ("DRAM") chips.

The input/output terminals of main memory 22 are coupled to the respective data bus lines in processor bus 31.

The CPU 21 can communicate between I/O devices 24 through system controller 23 via system bus 32 and processor bus 31.

The system controller 23 controls the operational timing of all components of the system which include CPU 21, main memory 22, and also I/O devices 24 and VRAM 25.

One feature of the present invention is to construct the system controller 23 using a single gate array LSI which includes built-in write buffer means 232. Built-in write buffer means 232 can be connected to CPU 21 without providing any additional coupling pins. The address buffer means 231 is also built-in the same single gate array of system control means 23.

The address buffer means 231 and write buffer means 232 are respectively constructed as a latch circuit using a single stage first-in first-out ("FIFO") buffer.

The write buffer means 232 latches the write data CPU 21 to processor bus 31 in parallel to main memory 32 during a memory write cycle.

When address buffer means 231 and write buffer means 232 respectively latches the data, system controller 23 delivers a control ready ("RDY#") signal to CPU 21 in order to suspend the present memory write cycle by CPU 21 even if the write access of the CPU is still uncompleted.

The I/O terminals of the opposite side of address buffer means 231 are coupled to main memory 22 through memory address bus 33.

The system controller 23 provides a plurality of memory access control signals during the memory write cycle.

The operation of the stop control signal and a plurality of the memory access control signals for the write buffer means 232 are substantially important for understanding the characteristic feature of this invention.

Figure 2:
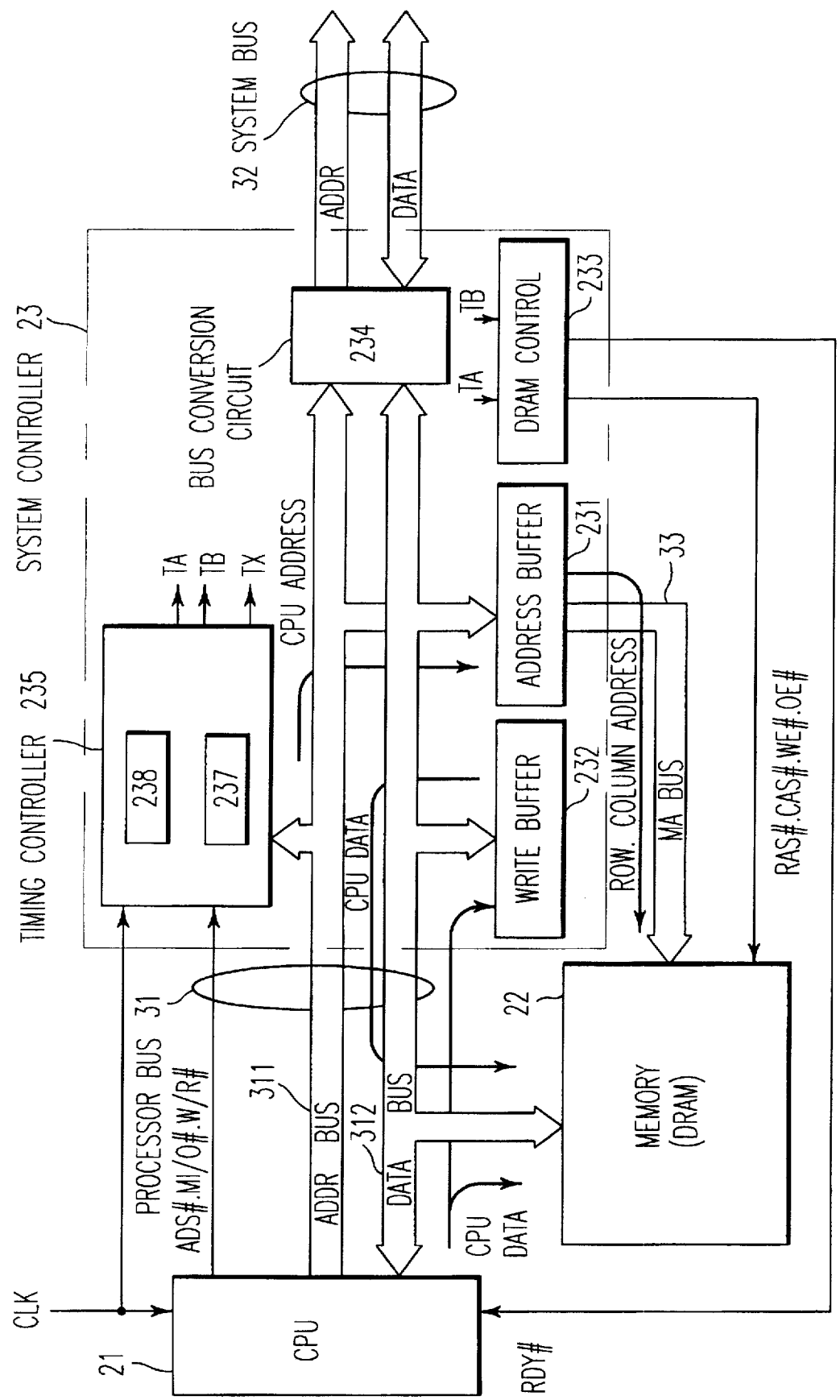
FIG. 2 depicts a detailed schematic diagram of the system controller shown in FIG. 1 indicating the direction of signal flow.

FIG. 2 depicts in detail the essential features of the embodiment in FIG. 1, indicating the essential components, data flow and the flow of control signals for memory write access.

As shown in FIG. 2, system controller 23 includes at least a timing control circuit 235 (hereinafter referred to as "timing controller"), a main memory control circuit 233 (hereinafter referred to as "DRAM controller") and an address buffer means 231 and write buffer means 232, as explained before.

The bus conversion circuit 234 adjusts the data width between 32 bit processor bus 31 and 16 bit system bus 32 in order to access input/output ("I/O") devices and the volatile random access memory ("VRAM").

The clock ("CLK") signal is synchronously applied to both CPU 21 and system controller 23. The clock signal is provided to almost all components of the system through system controller 23.

Only bus conversion circuit 234 requires an asynchronous timing signal relative to the CLK signal.

As explained before, address buffer means 231 ms a single stage latch circuit and the input terminals of address buffer 231 are coupled to address bus 311 in processor bus 31. The output terminals of address buffer means 231 are coupled to main memory 22 through memory address bus 33.

When address buffer means 231 latches address data from CPU 21 during a CPU memory write cycle, the latched address data is divided into successive row addresses and is supplied to main memory 22 through memory address bus 33.

In this embodiment, the upper bits of the divided address data indicate a row address and the lower bits defined a column address.

The timing controller 235 includes judgement circuit 237 for judging whether received address data from address bus 311 is the memory address for the present memory write cycle.

The timing controller 235 further includes monitor circuit 238 for detecting whether the present CPU bus cycle is a memory write cycle.

The write buffer means 232 comprises a latch circuit and the input/output terminals of write buffer 232 are coupled to data bus 312 as defined in processor bus 31.

Since DRAM main memory 22 is coupled to data bus 312 in parallel to write buffer means 232, the memory write data from CPU 21 is simultaneously supplied to write buffer 232 as shown by a continuous arrow in FIG. 2.

The latching timing and output timing of memory data are controlled by the timing controller 235.

The timing controller 235 includes judgement circuit 237 for detecting the CPU address to the main memory and also includes monitor circuit 238 for monitoring the status of the CPU bus cycle to DRAM main memory 22.

Responding to the respective outputs from the monitor circuit and the judgement circuit, timing controller 235 delivers a DRAM control timing signals TA and TB to the DRAM control circuit 233.

When the DRAM control circuit 233 received the timing signal TA, a stop control ready ("RDY#") signal is delivered from the timing controller to CPU 21 in order to suspend the present CPU memory write cycle.

Further, timing signal TB is supplied from timing controller 235 to DRAM control circuit 233 which provides a plurality of memory access control signals such as a row address strobe ("RAS#") signal, a column address strobe ("CAS#") signal, a write enable ("WE#") signal and an output enable ("OE#") signal to main memory 22 in order to continue the suspended CPU memory write cycle by transferring the latched data to write buffer 232.

The timing controller 235, further controls the operational timing of bus conversion circuit 234.

The status signals being provided by CPU 21 are, for example, an address status ("ADS#") signal, a memory input/output ("M/IO#") signal and a write/read ("W/R#") signal.

The monitor circuit 238 in timing controller 235 watches the status of the present CPU bus cycle by detecting the changes of the status signals from CPU 21.

When the address status ("ADS#") signal becomes active the monitor circuit recognizes the beginning of present CPU bus cycle.

When the memory input/output ("M/IO#") signal turns to a high ("H") state, this indicates that the present CPU bus cycle is the status of a memory access. The "H" state of the write/read ("W/R#") signal indicates that the CPU's status belongs in a memory write cycle.

During a memory write cycle, CPU 21 delivers a write address (CPU address data) and a write data (CPU write data) via address bus 311 and data bus 312, respectively.

As explained before, the CPU address is latched into address buffer 231 and is converted into a successive row and column address. The successive row and column addresses are supplied to main memory 22 through memory address bus 33.

The CPU write data is delivered to data bus 312 which is coupled in parallel to main memory 22 and write buffer 232.

Consequently, the CPU write data on data bus 312 is simultaneously stored into both main memory 22 and write buffer 232.

When the write buffer means 232 latches the CPU write data, judgement circuit 237 in timing controller 235 delivers timing signal TA to DRAM control circuit 233.

Then timing controller 235 supplies stop control "RDY#" signal to CPU 21 for suspending the present memory write cycle.

Upon receiving the "RDY#" signal CPU 21 stops the present write cycle even if the actual memory access for the write cycle has not yet been completed.

In turn, immediately after stopping the CPU memory access for the write cycle, write buffer means 232 starts to provide the latched write data to main memory 22 under control of the write access control signals.

Accordingly, the actual write access of main memory 22 can be accomplished before completion of the present write cycle.

It is an important feature of the present invention to transfer the latched data in the write buffer means for completing the suspended CPU memory write cycle under the control of memory write control signals of the timing controller.

Now, referring to FIGS. 3(a)-3(k), the operational timing of the memory write cycle will be explained.

FIG. 3(a) shows a clock "CLK" signal from the clock generator. FIG. 3(b) shows the CPU address data being supplied from the CPU 21. FIG. 3(c) indicates the address status (ADS#) signal being delivered from CPU 21. FIG. 3(d) indicates the control ready (RDY#) signal from the DRAM control circuit.

FIG. 3(e) shows the memory write data from CPU 21. FIG. 3(f) indicates the latched data supplied from the write buffer for succeeding the stop of the CPU memory write access. FIG. 3(g) represents the memory write data delivered onto the data bus in the processor bus. FIG. 3(h) shows the successive row and column address being supplied to the main memory through the memory address bus.

FIGS. 3(i) is a memory access control signal of the row address strobe (RAS#) being provided from the DRAM control circuit. FIG. 3(j) is a memory access control signal of a column address strobe (CAS#) from the DRAM control circuit. FIG. 3(k) is a write access control signal of a write enable (WE#) from the DRAM control circuit.

The timing diagram shown in FIGS. 3(a)-3(k) explain the operation of a page mode write access of the DRAM main memory.

As is known, page mode operation is suitable for a high speed operation of a memory write cycle. Since every memory cell during page mode are connected term to the respective word line, all of the memory cells can be simultaneously activated by decoding only one of the row address.

The first CPU bus cycle A exemplifies a write access which includes a preparation term (T1 state) of single clock cycle and an actual memory (T2 state) of double clock cycle.

Since the T1 state of a CPU bus cycle is a preparation term for a memory access, the CPU does not yet delivers any data to the main memory. During the T2 state, an actual memory access by the CPU of the DRAM main memory is executed under the control of a plurality including control signals of the write enable ("WE#") signal (as shown in FIG. 3(k)) and the row address strobe ("RAS#") signal (as shown in FIG. 3(i)).

Figure 3:
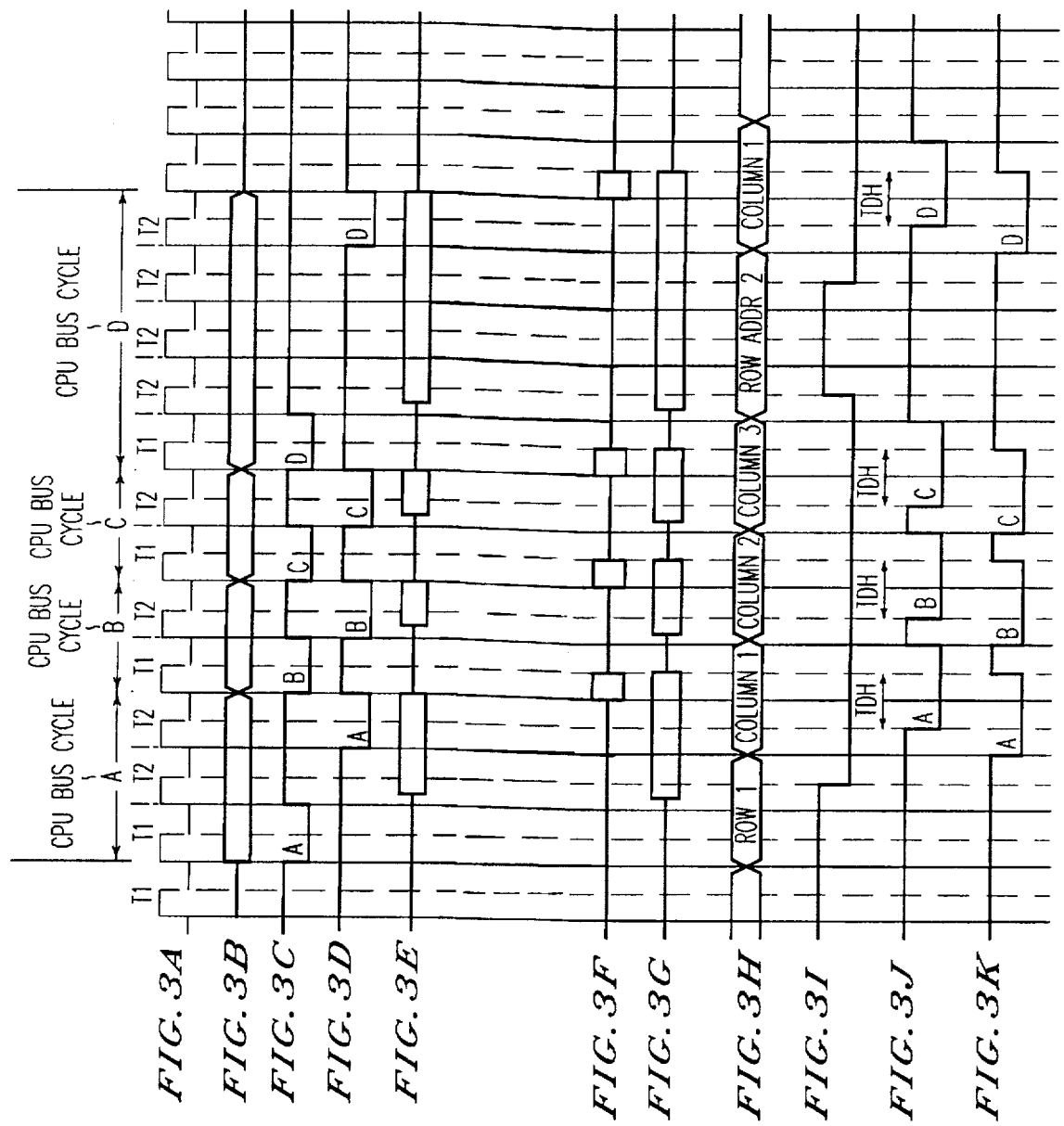

An address status ("ADS#") signal is delivered from CPU 21 to timing control circuit 235 for defining the preparation ("T1" state) and the actual memory access ("T2" state) of a CPU bus cycle (as shown in FIG. 3 (c))

During the "T1" state CPU 21 delivers address data onto address bus 311. Then the address data is latched into address buffer 231 and also provided to judgement circuit 237 in timing controller 235.

When judgement circuit 237 recognizes that the address data being transferred through address bus 311 is a memory address, timing controller 235 provides an address timing ("TA") signal to DRAM control circuit 233 in system controller 23.

The latched address data in address buffer 231 is converted into successive row and column addresses and is supplied to DRAM main memory 22 through memory address bus 33 in order to identify the actual memory address in the memory.

During the T2 state which follows the T1 state, the actual memory write data is delivered to the main memory through data bus 312.

The memory write data is delivered to write buffer 232 simultaneously since the data bus is coupled in parallel to both the main memory and the write buffer means.

When DRAM control circuit 233 receives the address timing ("TA") signal from timing controller 235, the DRAM control circuit activates a row address strobe ("ADS#") signal.

As shown in FIG. 3(i), during the falling edge of the address status ("ADS#") signal, the row address being transferred through the memory address bus actually begins to access the main memory.

As shown in FIG. 3(d), when the write buffer means 232 latches write data transferred through data bus 312, timing controller 235 supplies a ready timing ("TB") signal to DRAM control circuit 233.

The DRAM control circuit 233 generates (RDY#) signal to be active in the T2 state of CPU bus cycle A.

When CPU 21 receives the ready ("RDY#") signal from system controller 23, the present memory access by the CPU is suspended at the end of that clock cycle during the T2 state. But the CPU still continues to deliver the memory write data until the end of bus cycle A as shown in FIG. 3(e).

As shown in FIGS. 3(k) and 3(j), a write enable ("WE#") signal and a column address strobe ("CAS#") signal become active at the T2 state.

In response to the falling edge of the column address strobe ("CAS#") signal, the main memory incorporates the column address on the memory address bus from the address buffer.

Then the memory write data being transferred through the data bus 311 is actually stored into the main memory 22.

During the T2 state, the memory write access by the CPU is suspended even before the completion of the actual write access to the main memory. Namely, the CPU stops sending its write data to the main memory and the main memory is released from the memory write operation.

Immediately after the stop of the CPU's memory access, the memory write data which is latched into write buffer 232 is supplied to the DRAM memory through the same data bus in order to continue the actual write access until the completion of the CPU bus cycle A.

As shown in FIG. 3(j), the memory write data on data bus 312 is held during a data hold ("TDH") time which begins from the falling edge of the column address strobe ("CAS#") signal.

Consequently, the memory write operation into the main memory can be actually completed.

As shown in FIG. 3(i), the necessary time for transferring the memory write data from the write buffer is about a half clock cycle since the CPU continues to supply the memory write data until the end of that bus cycle.

The memory write access of the present CPU bus cycle A can be completed during the T1 state of the next CPU bus cycle B which begins after the CPU is released via the ready ("RDY") signal. Accordingly, a data collision on the data bus is prevented from occurring even though the write buffer means begins to transfer the latched write data by using the same data bus which is used for transferring the next write data from the CPU.

Of course, since write buffer 232 commonly uses data bus 312 in order to transfer the latched write data to main memory 22, there is some possibility of a data collision on data bus if the CPU 21 begins to execute the next CPU bus cycle during the data transfer from the write buffer.

However, as explained above, such data collisions can be prevented by the system according to the present invention because the data transfer from the write buffer means for completing the present CPU bus cycle is controlled so as to finish during the T1 state of the next CPU bus cycle.

Accordingly, a data collision is prevented even if the CPU begins to enter the next CPU bus cycle.

In the computer according to the present invention duration of the data transfer from the write buffer can be shortened because the actual memory write access can be started just after delivery of the data from CPU 21.

Consequently, CPU 21 can operate with only one wait cycle of a clock cycle for completion of CPU bus cycle A.

In FIGS. 3(a)–3(k), both CPU bus cycle B and CPU bus cycle C illustrate the case of the memory page hits. In this case, the respective row address does not change, and only the column address must be changed.

Accordingly, the respective CPU bus cycle can be completed with zero wait cycles.

In FIGS. 3(a)–3(k), the CPU bus cycle D shows the case in which a memory page miss has occurred. In this case, it is necessary to change the row address from the previous address data and also to precharge the input pins of the DRAM memory for receiving the row address strobe ("RAS#") signal. It is also necessary to insert another wait cycle compared to the CPU bus cycle A.

As explained above, since main memory 22 and write buffer 232 are coupled to processor bus 31 in parallel, CPU 21 can be released from its memory write cycle before the actual completion of the memory write access after write buffer 232 latched the memory write data.

Accordingly, the CPU can achieve a higher operational performance with no extension of the CPU bus cycle.

Also the computer system according to the present invention does not require any other special transceiver means for separating the CPU from the main memory nor a dedicated bus line for memory data transmission only, higher performance of the high speed CPU can be achieved without any increase in the number of coupling pins. This is particularly important for small size computer systems.

Further, the system according to the present invention can also achieve a high speed memory read cycle because no delay due to a transceiver occurs due to the transceiver.

Figure 4:
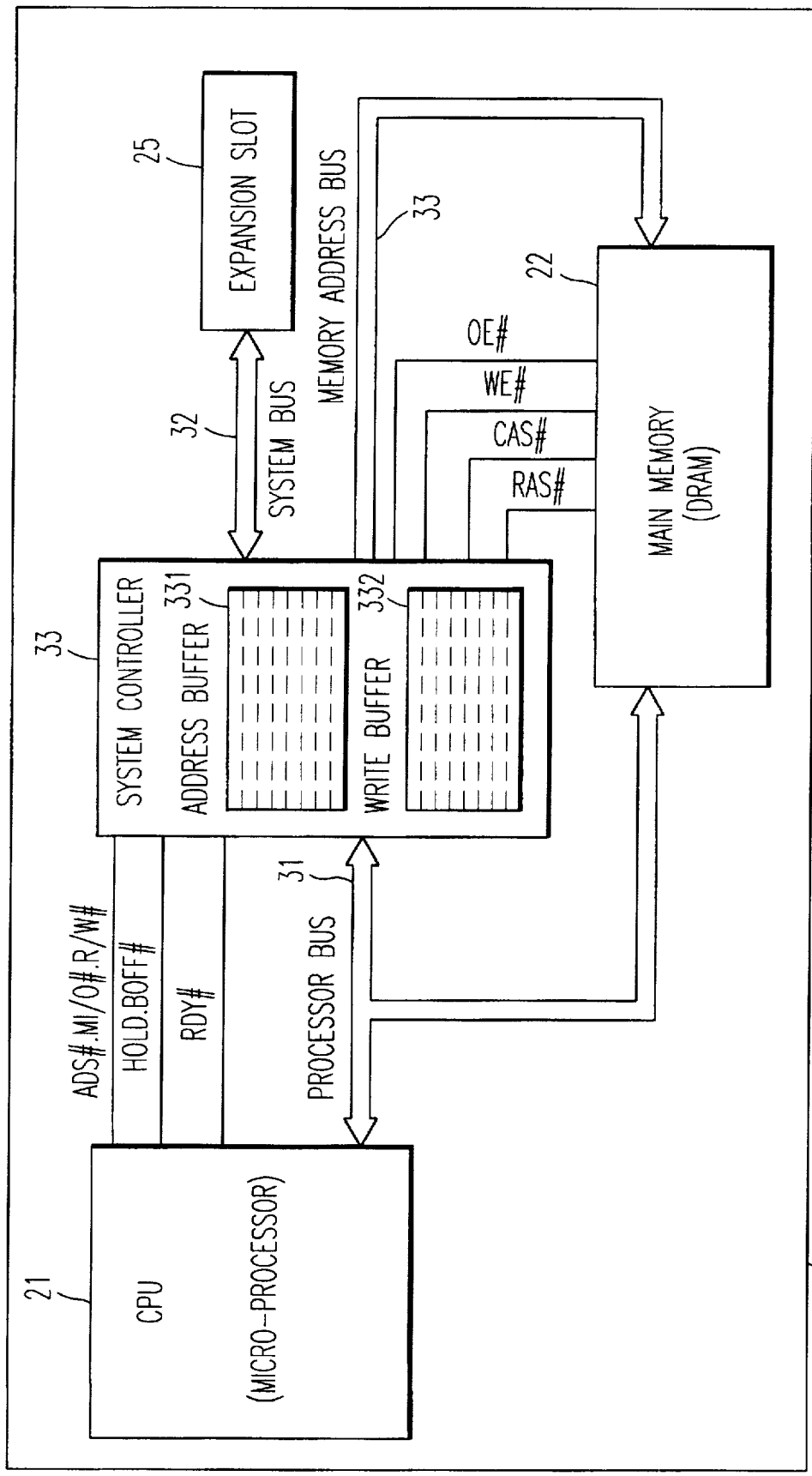
FIG. 4 is a schematic diagram of a computer system of another embodiment of the present invention.
Figure 5:
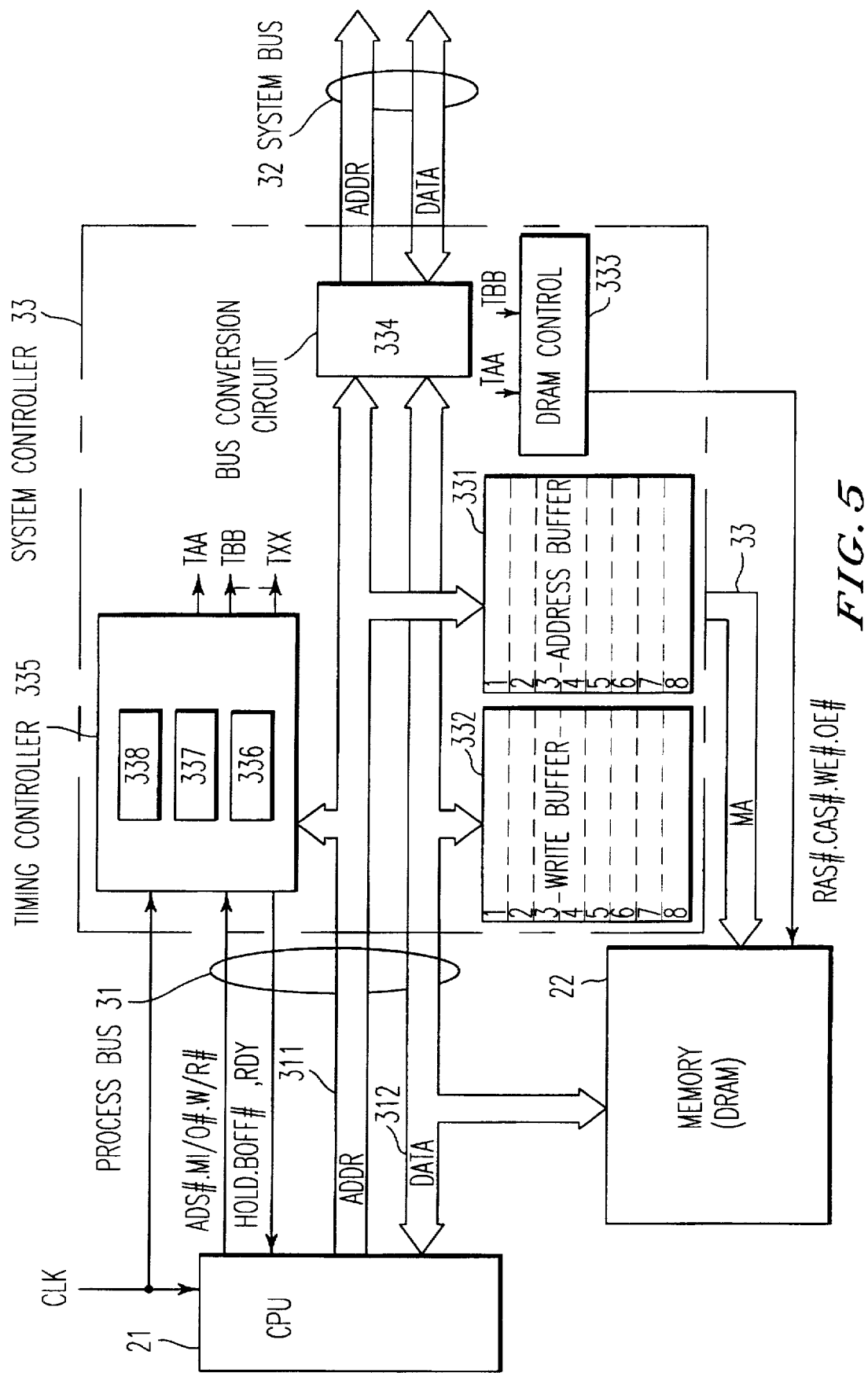
FIG. 5 is a detailed schematic diagram of the system controller shown in FIG. 4 indicating signal flow.

FIGS. 4 and 5 show another embodiment according to the present invention.

This embodiment is characterized in that the address buffer 331 and the write buffer 332 are comprised of a plurality of stage elements, respectively.

Components shown in FIGS. 4 and 5 have the same configuration as the embodiment shown in FIGS. 1 and 2. Accordingly, the same components have the same number as in FIGS. 1 and 2.

In this embodiment shown in FIGS. 4 and 5, the address buffer means 331 and the write buffer means 332 are comprised of eight stages of first-in first-out("FIFO") buffers, respectively.

The system controller 33 includes a timing controller 335, a DRAM controller 333, a multi stage address buffer means 331 and a multi stage write buffer means 332 in an LSI gate array.

The bus conversion circuit 334 is also included in the gate array for adjusting the data width between the processor bus 31 and the system bus 32 in order to access the input output ("I/O") devices and a volatile random access memory ("VRAM") means which are coupled to the system bus. The clock ("CLK") signal is supplied to both CPU 21 and system controller 33. The clock signal is further applied to every circuit in system controller 33.

The address buffer means 331 is a latch circuit and the input terminals of address buffer 331 are coupled to address bus 311 in processor bus 31.

The output terminals of address buffer means 331 are coupled to memory address bus 33.

When the address buffer means 331 latches address data from CPU 21 during a memory write cycle, the address is divided into a row address and a column address in the buffer and then the successive data of row and column addresses are supplied to memory address bus 33 alternatively.

The timing controller 335 includes judgement circuit 337 for judging whether the received address data from address bus 311 is the DRAM memory address for a memory write cycle or not.

The timing controller 335 further includes monitor circuit 338 for checking whether the CPU bus cycle is a memory write cycle or not.

The write buffer means 332 is a latch circuit and the input/output terminals of the write buffer are coupled to data bus 312 as defined in processor bus 31.

During a memory write cycle, system controller 33 delays the actual operation of the write access to the DRAM until address buffer means 331 and write buffer means 332 become full or each stores data up predetermined to a data storage level.

How system controller 33 avoids data collisions on processor bus 31 during a write access operation is explained as follows.

The first method for avoiding data collisions is to extend the memory read cycle of the CPU sufficiently. Then system controller 33 makes a write access to DRAM memory 22 during the extended cycle.

The second method for avoiding data collisions is to activate a bus hold (HOLD) signal when the idle T1 state is detected via a status signal and to release the processor bus during the T1 state for accessing write buffer 332 to the DRAM through processor bus 31.

The third method is to release the processor bus 31 compulsorily from the CPU bus cycle by activating a back off input ("BOFF#") signal. Namely, even if the CPU is executing a bus cycle using processor bus 31, the "BOFF#" signal suspends the present read/write execution compulsorily and releases processor bus 31 from the present access.

Then write buffer 332 write accesses the DRAM using the released processor bus 31.

Following are memory access methods which combine the above mentioned methods for avoiding data collisions and the conditions for beginning the write access.

If buffer-full is the condition for beginning the write access, timing controller 335 waits until the buffer means 331 and 332 become full. Then timing controller 335 detects whether the next CPU bus cycle is a memory read cycle or not.

When the next CPU bus cycle is a memory read cycle, the first method for avoiding data collision is used. If the next CPU bus cycle is not a memory read cycle, the third method for avoiding data collision is applicable.

The second method for access is to obtain the right to use the processor bus by using the second method for avoiding data collisions, where the beginning of the write access starts immediately after entering a data into the buffer.

The third access method is applicable when the write access is to begin after a predetermined amount of data is stored in the buffer, but the buffer is not full. When the data is stored up to the predetermined amount, the system controller tries to get write access using the first or second method for avoiding data collisions.

When the CPU executes a write access in a T1 state the system controller continues the buffering until a buffer-full condition. And if the buffer becomes full without a write access by the buffer, then the third method for avoiding data collisions is used.

The above mentioned access methods can be combined with each other.

FIG. 5 illustrates one embodiment for achieving the third write access method.

The timing controller 335 comprises of data counter 336, address judging circuit 337 and CPU bus cycle monitoring circuit 338.

The data counter counts the number of data stored in address buffer 331 write buffer 332. As mentioned before, address buffer 331 is comprised of a "FIFO" buffer of eight stages and the input terminals are coupled to address bus 311.

The write buffer also is comprised of a "FIFO" buffer of eight stages and the i/O terminals coupled to the data bus in parallel to the DRAM main memory 22.

The monitoring circuit 338 in timing controller 335 monitors the CPU bus cycle in accordance with the changes of the following status signals from CPU 21, for example address status ("ADS#")signal, a memory input/out ("MI/O#")signal, and a write/read ("W/R#") signal, and controls the operation of the units in the system controller 33.

The "ADS#" signal become active when the CPU begins the bus cycle. When the CPU execute a memory write access the "M/IO#" signal and the "W/R#" signal becomes high ("H").

From the above condition the timing controller 335 recognizes that the bus cycle is a memory write cycle.

During a memory read cycle, the "W/R#" status signal is low ("L"), and timing controller 335 recognizes that the CPU is in a read cycle by detecting this condition.

The timing controller 335 can also detect the occurrence of the idle ("T1") state in the bus cycle by detecting the above-mentioned status signals.

The timing controller 335 controls the data latching timing into address buffer 331 and write buffer 332 from the processor bus during a memory write cycle.

When the buffers latch their respective data, timing controller 335 delivers the control "RDY#" signal to CPU 21 in order to suspend the CPU's memory write cycle.

In this embodiment, data counter means 336 in timing controller 335 detects that four pieces of data are stored in multi stages write buffer 332. The timing controller 335 waits until the occurrence of the idle ("Ti") state by detecting status signals from CPU 21.

If idle ("Ti") state does not occur, the timing controller 335 waits until execution of the next bus cycle and detects whether the next bus cycle is a memory read cycle or not.

When the next bus cycle is recognized as a memory read cycle, timing controller 335 does not deliver the "RDY#" control signal in order to extend the memory read cycle of the CPU.

Then timing controller 335 delivers an indication signal to DRAM controller 333 so as to begin the write access during that extended read cycle.

DRAM control circuit 333 controls address buffer 331 and write buffer 332 to output their respective data in order to execute the memory write access.

If timing controller 335 detects the occurrence of the T1 state, it activates the bus hold ("HOLD") signal. CPU 21 is released from the processor bus 31 by receiving the HOLD signal. While CPU 21 is released from the process bus, the memory write access is executed using processor bus 31.

If the memory write cycle occurs without detecting both of the occurrence of the idle T1 state and the read cycle, timing controller 335 buffer data buffers 331 and 332 to store their respective data until data counter 336 counts up to the buffer-full state.

When the data counter 336 detects the buffer-full state, timing controller 335 activates a bus off input ("BOFF#") signal in order to compulsorily suspend the present bus cycle and in order to release processor bus 31.

While the processor bus 31 is released, system controller 33 executes the write access to memory 22 through processor bus 31. After finishing the write access timing controller 335 makes the bus off input ("BOFF#") signal inactive in order to restart the suspended bus cycle.

In this embodiment, the memory access does not execute until a predetermined amount of write data is stored in the buffers, allowing CPU 21 to operate during a write cycle at a much higher speed.

Accordingly, the CPU can operate with zero wait states in almost all memory write cycles. Also, the hardware configuration of the system can be simplified since write buffer 332 and main memory 22 are coupled in parallel to system bus 31.

As explained in the above embodiments, the present invention can achieve higher system performance by reducing the wait cycles in the CPU bus cycle with a simplified configuration.

Further the computer according to the present invention can easily control avoidance of data collisions on the processor bus.

What is claimed is:

1. A computer system, comprising:
   a CPU having a CPU bus cycle including at least a preparation and data transfer state, and a memory write cycle;
   a main memory for storing data;
   system control means for controlling operational timings of components in said computer system;
   a processor data bus coupling said CPU, said main memory and said system control means;
   a processor address bus coupling said CPU and said system control means;
   memory address bus, coupling said system control means and said main memory, for transferring memory address data during said memory write cycle;
   said system control means comprising,
      a write buffer means, coupled to said processor data bus in parallel to said main memory, for latching write data during said memory write cycle,
      an address buffer means, coupled to said processor address bus and said memory address bus, for latching address data during said memory write cycle, and
      a memory control means for generating a stop control signal used for suspending a present memory write cycle of said CPU when said write buffer means latches write data on said processor data bus, and for generating a plurality of memory access control signals used by said main memory for storing said latched write data in said main memory; and
   wherein said CPU executes said memory write cycle during a plurality of CPU bus cycles, said write buffer means latches said write data on said processor data bus during said preparation state of a present CPU bus cycle, and said write data is transferred to said main memory over said processor data bus during said data transfer state of a subsequent CPU bus cycle.

2. A computer system according claim 1, wherein said write buffer means and said address buffer means each comprise a single latch circuit of a first-in first-out type.

3. A computer system according claim 1, wherein said address buffer means includes means for converting said address data into row and column data and for transferring said row and column data to said main memory on said memory address bus.

4. A computer system according to claim 1, wherein said plurality of memory access control signals include at least a write enable signal, a column address strobe signal and a row address strobe signal which are used for continuing said memory write cycle after said stop control signal suspends said present memory write cycle.

5. A computer system as defined in claim 1, wherein said system control means further includes a timing control circuit for receiving a plurality of status signals from said CPU and for generating timing signals.

6. A computer system as defined in claim 5, wherein said memory control means further includes a main memory control circuit which generates said stop control signal and said memory access control signals in response to said timing signals from said timing control circuit.

7. A computer system according to claim 5, wherein said timing control circuit comprises:
   a monitor circuit which receives said CPU status signals and a judgement circuit for detecting said memory write cycle, and
   wherein said monitor circuit generates said timing signals.

8. A computer system as defined in claim 1, wherein said main memory comprises a dynamic random access memory, and
   wherein said system control means comprises a gate array LSI.

9. A computer system, comprising:
   a CPU having a CPU bus cycle including at least a preparation and data transfer state, and a memory write cycle;
   a main memory for storing data;
   a system control means for controlling operational timings of respective components in said computer system;
   a processor data bus coupling said CPU, said main memory and said system control means;
   a processor address bus coupling said CPU and said system control means;
   a memory address bus, coupling said system control means and said main memory, for transferring memory address data during said memory write cycle;
   said system control means comprising,
      a plurality of write buffer means, coupled to said processor data bus in parallel to said main memory, for latching a predetermined number of write data during said memory write cycle,
      a plurality of address buffer means, coupled to said processor address bus and said memory address bus, for latching said memory address data during said memory write cycle,
      a timing control means for generating a stop control signal used by said CPU for stopping said CPU memory write cycle when said plurality of write buffer means latch said predetermined number of write data on said processor data bus, and
      a main memory control means for generating a plurality of memory access control signals; and
   wherein said CPU executes said memory write cycle during a plurality of CPU bus cycles, said plurality of write buffer means latch said predetermined number of write data on said processor data bus during said preparation state of CPU bus cycles, and said predetermined number of write data is transferred to said main memory over said processor data bus during said data transfer state of subsequent CPU bus cycles.

10. A computer system according to claim 9, wherein said timing control means further includes a timing control circuit for receiving a plurality of status signals from said CPU and for generating first and second timing signals and said stop control signal.

11. A computer system according to claim 10, wherein said memory control means further includes a main memory control circuit which generates said plurality of memory access control signals in response to said first and second timing signals from said timing control circuit.

12. A computer system according to claim 10, wherein said timing control circuit comprises:
   a monitor circuit for monitoring a status of said CPU bus cycle, and
   a judgement circuit for detecting said memory write cycle.

13. A computer system according to claim 12, wherein said system control means includes means for providing a hold requirement signal to said CPU when said monitor circuit detects an idle state, and
   wherein said CPU, in response to said hold requirement signal, releases said processor data bus from said memory write cycle.

14. A computer system according to claim 12, wherein said system control means includes means for generating a back off input signal used by said CPU for releasing said processor data bus from said memory write cycle when said plurality of write buffer means are full.

15. A computer system according to claim 12, wherein said system control means includes means for generating a ready signal used by said CPU for extending said memory write cycle.

16. A computer system according to claim 10, wherein said timing control circuit further includes a data counter means for counting a predetermined number of latched data in said plurality of write buffer means, and wherein said data counter means includes a means for generating said first and second timing signals, said second timing signal generated when said data counter means counts said predetermined number of latched data in said plurality of write buffer means.

17. A computer system according to claim 16, wherein said system control means includes means for providing a plurality of CPU control signals in response to said second timing signal generated by said data counter means.

18. A computer system, comprising:

a CPU including a write-through-cache memory for executing a predetermined number of CPU bus cycles each having at least a preparation and data transfer state;

processor bus including at least a data bus and an address bus coupled to said CPU;

a main memory comprising a plurality of DRAM chips for storing data and coupled to said data bus; and a system control means comprising a single gate array LSI and including at least a timing control circuit, a write buffer means, an address buffer means and a DRAM control circuit, wherein said timing control circuit comprises,
  a monitor circuit for receiving a plurality of status signals from said CPU, and
  a judgement circuit coupled to said processor bus for detecting a present CPU bus cycle, said monitor and judgment circuits generating timing signals, wherein said write buffer means is coupled to said data bus in parallel to said main memory so as to receive write data from said CPU during a memory write cycle and during said data transfer state of said CPU bus cycle, wherein said address buffer means, is coupled in series between said address bus and said main memory, for decoding address data from said processor bus to row and column addresses to said main memory, and wherein said DRAM control circuit generates a CPU control signal when said write buffer means latches a predetermined number of write data and generates a plurality of DRAM access control signals in response to said timing signals from said monitor circuit and said judgement circuit, wherein said CPU control signal suspends a present memory write cycle from said CPU to said main memory, and wherein said plurality of DRAM access control signals control a transfer of said latched write data in said write buffer means to said main memory in order to complete said suspended memory write cycle during said data transfer state of said CPU bus cycle.

* * * * *